United States Patent
Goodlow

(10) Patent No.: US 8,117,994 B1
(45) Date of Patent: Feb. 21, 2012

(54) ANIMAL RAMP APPARATUS AND METHOD OF USE

(76) Inventor: Troy K. Goodlow, Freehold, NJ (US)

( * ) Notice: Subject to any disclaimer, the term of this patent is extended or adjusted under 35 U.S.C. 154(b) by 858 days.

(21) Appl. No.: 12/177,247

(22) Filed: Jul. 22, 2008

(51) Int. Cl.
*B65G 69/28* (2006.01)

(52) U.S. Cl. .......... 119/849; 119/848; 119/847; 14/71.1

(58) Field of Classification Search .............. 119/847, 119/843, 849, 848, 28.5, 706; 14/71.1, 69.5, 14/71.3; D30/119, 199, 160; 414/921, 537; D34/32; 114/362
See application file for complete search history.

(56) References Cited

U.S. PATENT DOCUMENTS

| | | | |
|---|---|---|---|
| 3,159,141 A * | 12/1964 | Paterek | 119/706 |
| 3,173,398 A | 3/1965 | Raymond | |
| 5,213,060 A | 5/1993 | Sloan et al. | |
| D382,676 S | 8/1997 | Holbrook | |
| D422,412 S | 4/2000 | Greene | |
| 6,119,634 A | 9/2000 | Myrick | |
| D440,717 S * | 4/2001 | Fazio | D30/119 |
| 6,267,082 B1 * | 7/2001 | Naragon et al. | 119/849 |
| 6,536,064 B1 | 3/2003 | Swink et al. | |
| 6,536,372 B1 | 3/2003 | Loeser | |
| 6,588,366 B1 * | 7/2003 | Ranson et al. | 119/28.5 |
| 6,691,645 B1 * | 2/2004 | Ayers, Jr. | 119/847 |
| 6,715,177 B1 | 4/2004 | Lagergren-Julander | |
| 6,941,889 B1 * | 9/2005 | McCrocklin et al. | 114/362 |
| 6,968,810 B2 | 11/2005 | Bishop | |
| 7,185,381 B1 | 3/2007 | Heartsill et al. | |
| 7,523,516 B1 * | 4/2009 | Waddell et al. | 14/69.5 |
| 7,526,826 B2 * | 5/2009 | Bailie | 14/69.5 |
| D604,018 S * | 11/2009 | Simpson et al. | D30/160 |
| 2005/0160539 A1 * | 7/2005 | Schomaker et al. | 14/69.5 |

* cited by examiner

*Primary Examiner* — T. Nguyen

(57) ABSTRACT

An animal ramp apparatus includes a panel that has a top side, a bottom side, a first end, a second end, a first lateral edge and a second lateral edge. A base frame includes a front wall, a rear wall, a first side wall and a second side wall. The first end of the panel is pivotally coupled to the base frame adjacent to the rear wall. The second end of the panel is selectively pivoted upwardly from the frame to define a deployed position. A support member is pivotally attached to the frame and supports the panel in the deployed position at a selected angle relative to the base frame.

2 Claims, 7 Drawing Sheets

ANIMAL RAMP APPARATUS AND METHOD OF USE

BACKGROUND OF THE INVENTION

Field of the Invention

The present invention relates to pet ramp devices and more particularly pertains to a new pet ramp device for providing easy access to a pet owner's bed by a pet.

SUMMARY OF THE INVENTION

The present invention meets the needs presented above by generally comprising a panel that has a top side, a bottom side, a first end, a second end, a first lateral edge and a second lateral edge. A base frame includes a front wall, a rear wall, a first side wall and a second side wall. The first end of the panel is pivotally coupled to the base frame adjacent to the rear wall. The second end of the panel is selectively pivoted upwardly from the frame to define a deployed position. A support member is pivotally attached to the frame and supports the panel in the deployed position at a selected angle relative to the base frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
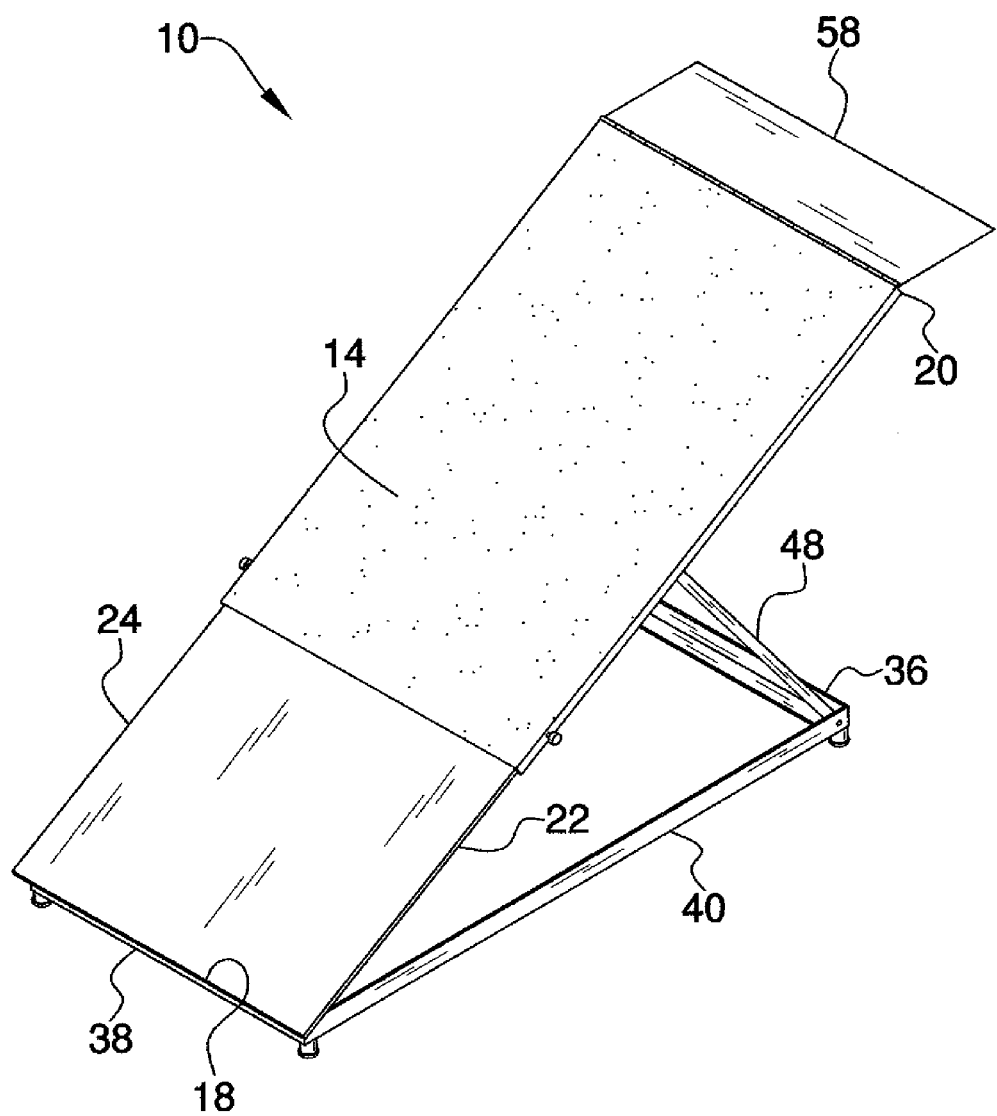
FIG. 1 is a rear perspective view of an animal ramp apparatus and method of use according to the present invention.
Figure 2:
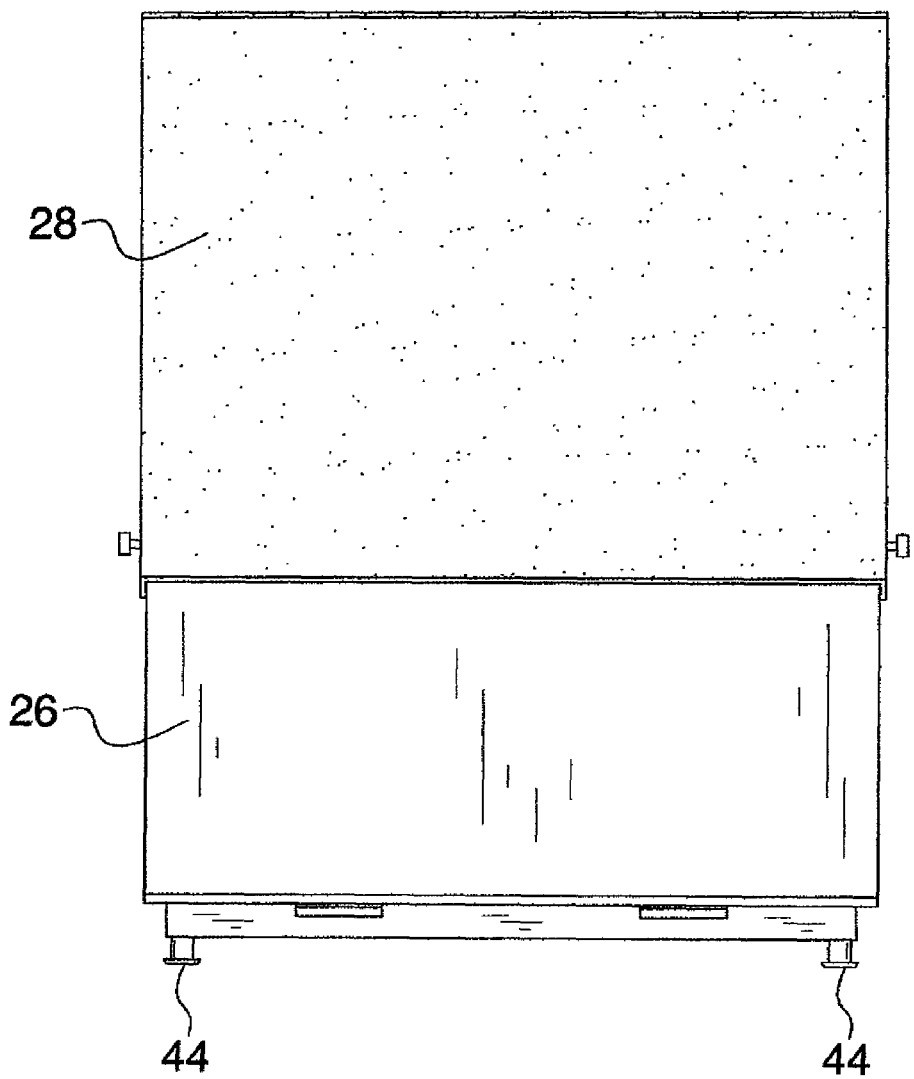
FIG. 2 is a rear view of the present invention.
Figure 3:
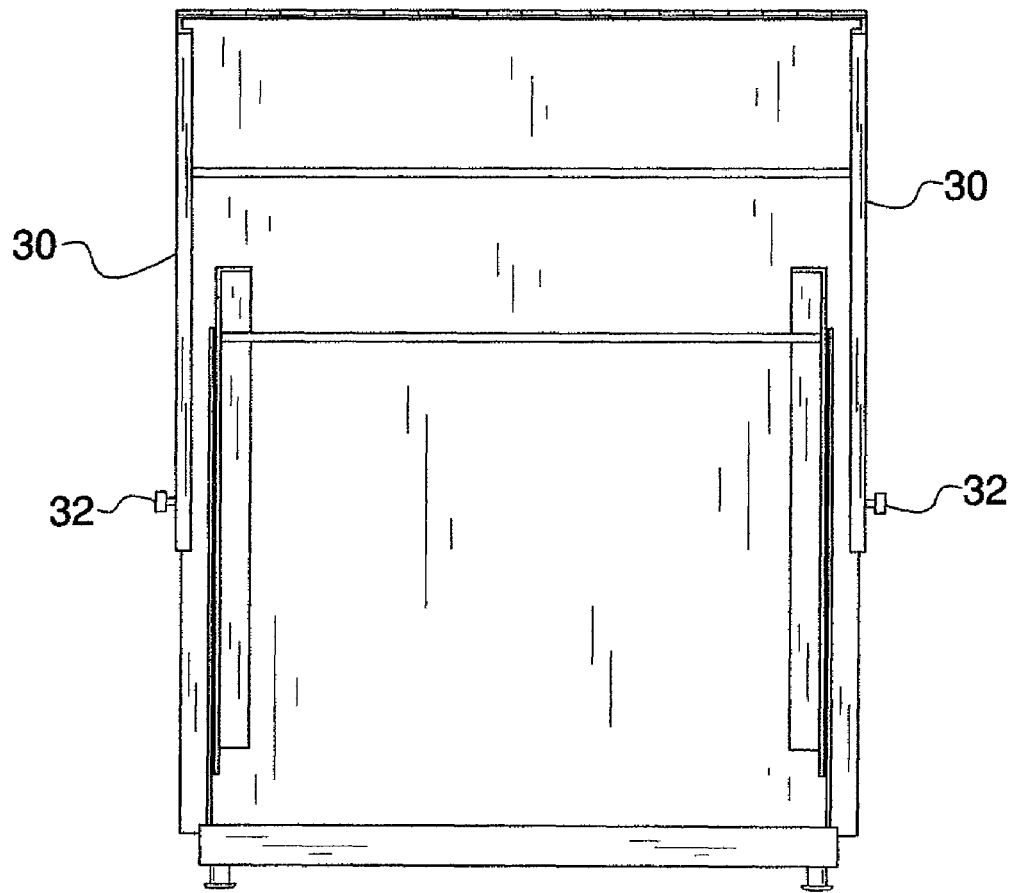
FIG. 3 is a front view of the present invention.
Figure 4:
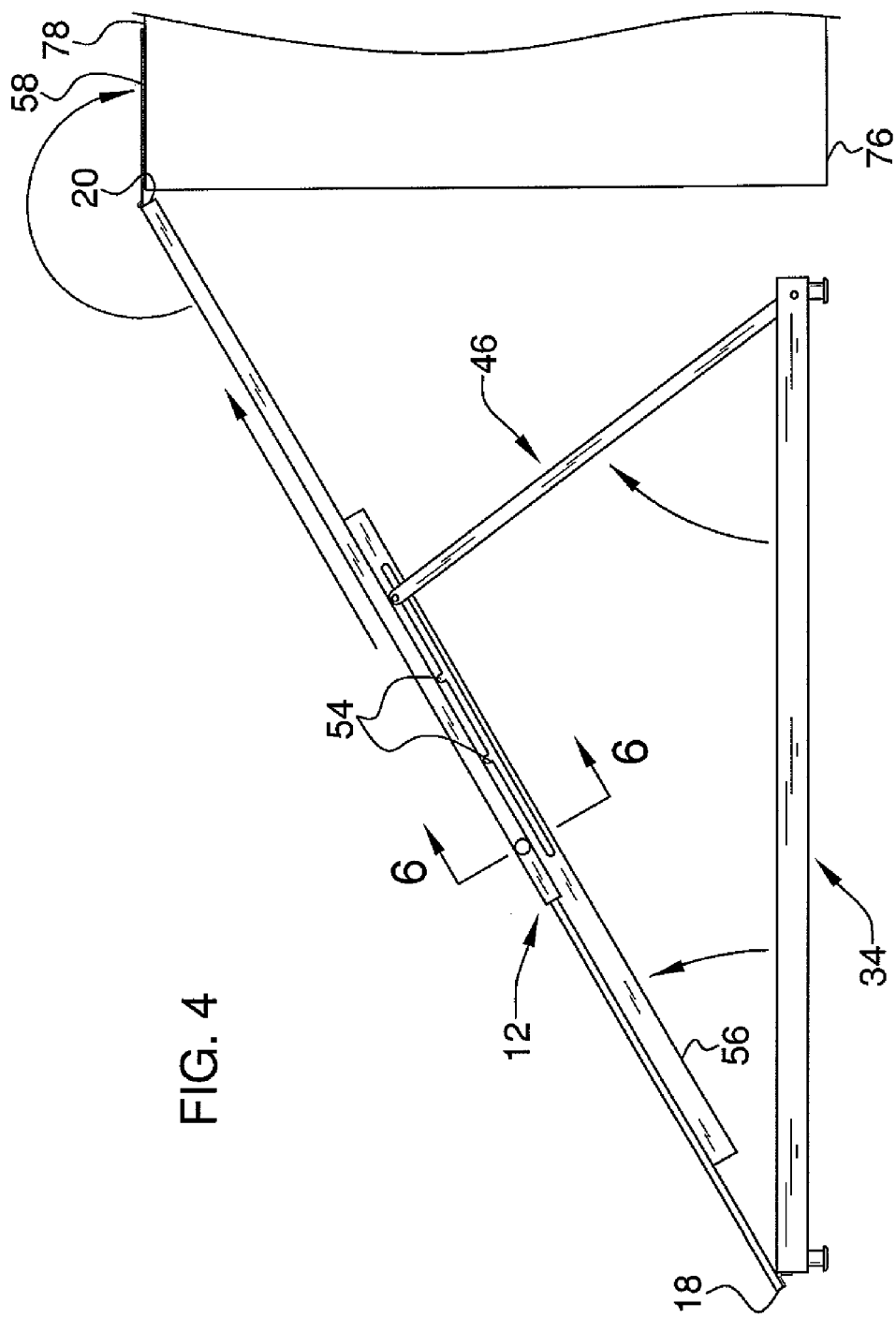
FIG. 4 is a side view of the present invention in a deployed position.
Figure 5:
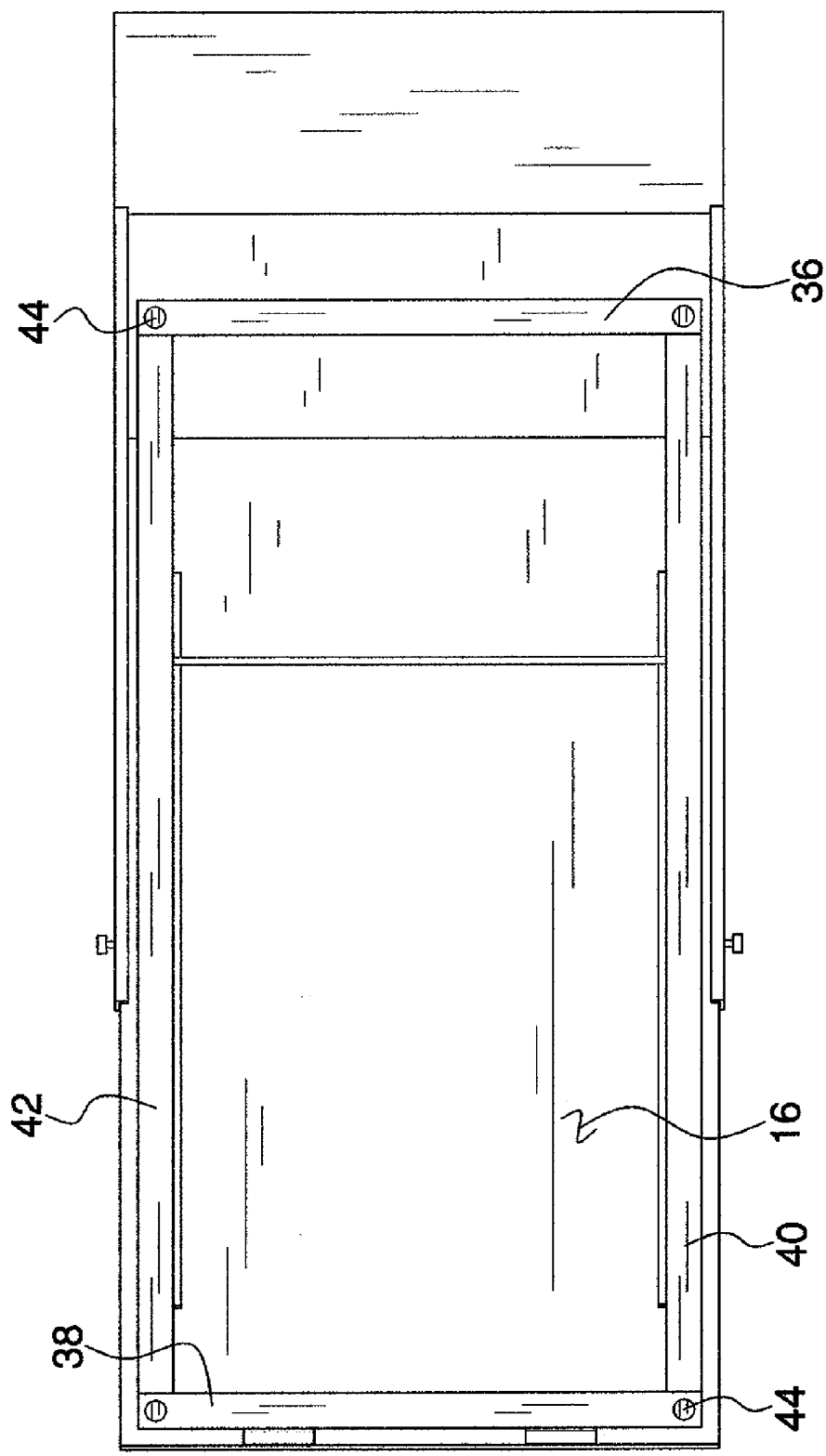
FIG. 5 is a bottom view of the present invention.
Figure 6:
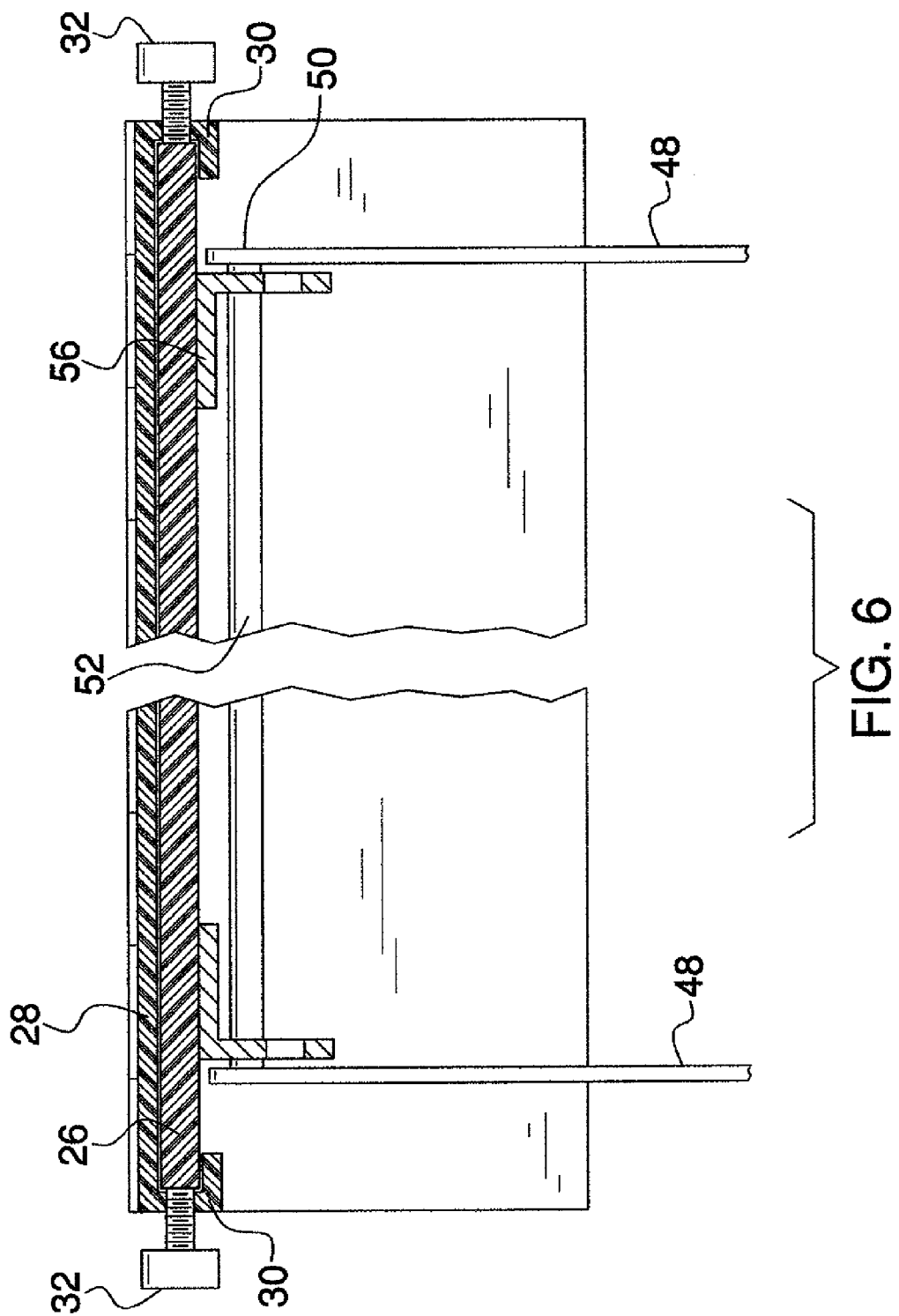
FIG. 6 is a cross-sectional view taken along line 6-6 of FIG. 4 of the present invention.
Figure 7:
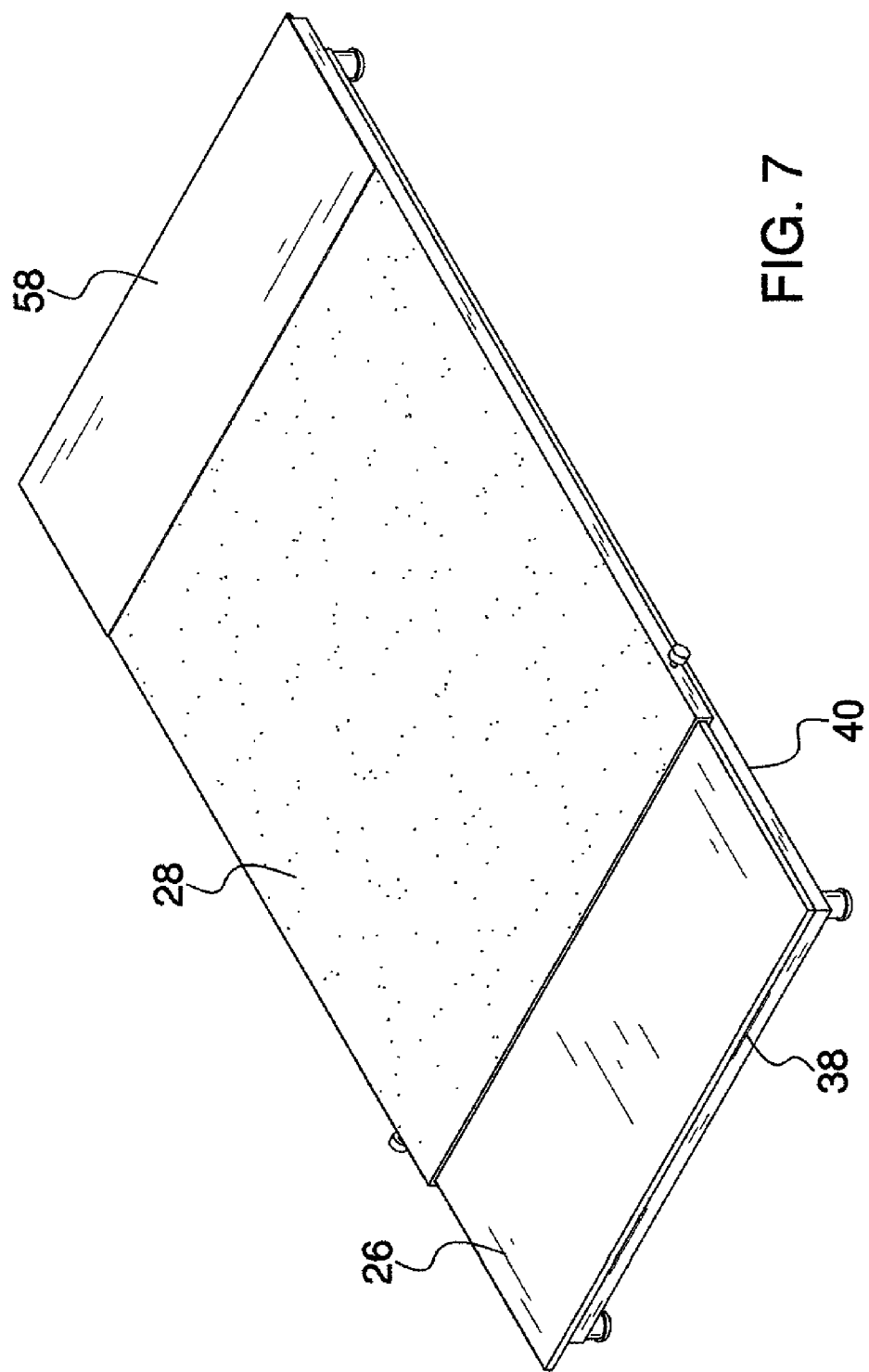
FIG. 7 is a perspective view of the present invention in a collapsed position.

With reference now to the drawings, and in particular to FIGS. 1 through 7 thereof, a new pet ramp device embodying the principles and concepts of the present invention and generally designated by the reference numeral 10 will be described.

As best illustrated in FIGS. 1 through 7, the animal ramp apparatus and method of use 10 generally comprises a panel 12 that has a top side 14, a bottom side 16, a first end 18, a second end 20, a first lateral edge 22 and a second lateral edge 24. The panel 12 includes a first section 26 and second section 28 telescopically engaged with each other to allow a length between the first 18 and second 20 ends to be selectively adjusted. At least one locking member 30 is engageable with each of the first 26 and second 28 sections to releasably lock the first 26 and second 28 sections together at a selected position relative to each other. The second section 28 is positioned on top of the first section 26 and the second section 28 includes side rails 30 engaging the first 22 and second 24 lateral edges of the first section 26. The at least one locking member 32 is threadably engaged with one of the rails 30 and is abuttable against the first section 26 to frictionally couple the first section 26 to the second section 28. At least a portion of the top side 14 comprises a non-smooth surface to provide traction for a pet. The first section 26 has a length between 28 inches and 36 inches and the second section 28 has a length between 22 inches and 30 inches. The panel 12 has a width between 12 inches and 24 inches.

A base frame 34 includes a front wall 36, a rear wall 38, a first side wall 40 and a second side wall 42. The first end 18 of the panel 12 is pivotally coupled to the base frame 34 adjacent to the rear wall 38. The second end 20 of the panel 12 is selectively pivoted upwardly from the base frame 34 to define a deployed position. A plurality of legs 44 is attached to and extends downwardly from the base frame 34. Each of the legs has a height less than 6 inches.

A support member 46 is pivotally attached to the base frame 34 and supports the panel 12 in the deployed position at a selected angle relative to the base frame 34. The support member 46 includes a pair of elongated members 48 each being pivotally coupled to the base frame 34 adjacent to the front wall 36. Each of the elongated members 48 has an upper end 50. A rod 52 is attached to and extends between the upper ends 50. The rod 52 releasably engages one of a plurality of notches 54 in receiving member 56 attached to the bottom side 16 of the panel 12.

An extension plate 58 is hingedly coupled to the second end 20 of the panel 12. The extension plate 58 is pivotably extendable away from the second end 20 to cover a gap between the second end 20 and a person's bed 76 to ensure that the pet does not fall between the panel 12 and the bed 76.

In use, the panel 12 is positioned adjacent to the bed 76 and its length and angle are adjusted to position the second end 20 adjacent to an upper surface 78 of the bed 76. The support member 46 is then engaged with the panel 12 to retain the panel 12 at a selected angle and the extension plate 58 is then extended and abutted against an upper surface 78 of the bed 76. The pet may then easily walk up the panel 12 to gain access to bed 76.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of providing access to a person's bed by a pet, said method comprising the steps of:

providing a bed;
providing a panel having a top side, a bottom side, a first end, a second end, a first lateral edge and a second lateral edge, said panel including a first section and second section telescopically engaged with each other to allow a length between said first and second ends to be selectively adjusted, at least one locking member being engageable with each of said first and second sections to releasably lock said first and second sections together at a selected position relative to each other;
providing a base frame including a front wall, a rear wall, a first side wall and a second side wall, said first end of said panel being pivotally coupled to said base frame adjacent to said rear wall, said second end of said panel being selectively pivoted upwardly from said base frame to define a deployed position, a plurality of legs being attached to and extending downwardly from said base frame, each of said legs having a height less than 6 inches;
providing a support member being pivotally attached to said base frame and supporting said panel in said deployed position at a selected angle relative to said base frame;
providing an extension plate being hingedly coupled to said second end of said panel, said extension plate being pivotably extendable away from said second end to cover a gap between said second end and said bed;
positioning said base frame adjacent to said bed;
adjusting an angle and a length of said panel to position said second end adjacent to an upper surface of said bed;
engaging said support member with said panel to retain said second end adjacent to the supper surface of said bed; and
extending said extension plate to abut said upper surface of said bed with said extension plate such that the pet may walk up said panel and onto said bed.

2. A method of providing access to a person's bed by a pet, said method comprising the steps of:
providing a bed;
providing a panel having a top side, a bottom side, a first end, a second end, a first lateral edge and a second lateral edge;
providing a base frame including a front wall, a rear wall, a first side wall and a second side wall, said first end of said panel being pivotally coupled to said base frame adjacent to said rear wall, said second end of said panel being selectively pivoted upwardly from said base frame to define a deployed position;
providing a support member being pivotally attached to said base frame and supporting said panel in said deployed position at a selected angle relative to said base frame;
providing an extension plate being hingedly coupled to said second end of said panel, said extension plate being pivotably extendable away from said second end to cover a gap between said second end and said bed;
positioning said base frame adjacent to said bed;
adjusting an angle and a length of said panel to position said second end adjacent to an upper surface of said bed;
engaging said support member with said panel to retain said second end adjacent to the supper surface of said bed; and
extending said extension plate to abut said upper surface of said bed with said extension plate such that the pet may walk up said panel and onto said bed.

* * * * *